United States Patent
Sugawara

(10) Patent No.: US 8,878,966 B2
(45) Date of Patent: Nov. 4, 2014

(54) IMAGE PICKUP APPARATUS HAVING FOCUS DETECTING FUNCTION

(75) Inventor: Atsushi Sugawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 13/493,239

(22) Filed: Jun. 11, 2012

(65) Prior Publication Data

US 2012/0320241 A1 Dec. 20, 2012

(30) Foreign Application Priority Data

Jun. 15, 2011 (JP) .................. 2011-132876

(51) Int. Cl.
*H04N 9/64* (2006.01)
*H04N 5/232* (2006.01)
*H04N 5/369* (2011.01)
*G03B 13/36* (2006.01)

(52) U.S. Cl.
CPC ............ *H04N 5/23212* (2013.01); *G03B 13/36* (2013.01); *H04N 5/3696* (2013.01)
USPC ....................... 348/247; 348/222.1

(58) Field of Classification Search
CPC ..... H04N 5/367; H04N 9/045; H04N 5/3675; H04N 5/2176; H04N 5/361; H04N 5/23212; G03B 13/36
USPC ....................................... 348/246
See application file for complete search history.

(56) References Cited

U.S. PATENT DOCUMENTS

2006/0238629 A1* 10/2006 Sato et al. ............... 348/241
2007/0279365 A1* 12/2007 Kageyama ............... 345/100
2010/0245631 A1* 9/2010 Hoda et al. .............. 348/241

FOREIGN PATENT DOCUMENTS

| JP | 2000-292686 | 10/2000 |
| JP | 2001-177756 | 6/2001 |
| JP | 2009-163229 | 7/2009 |

* cited by examiner

*Primary Examiner* — Twyler Haskins
*Assistant Examiner* — Fayez Bhuiyan
(74) *Attorney, Agent, or Firm* — Cowan, Liebowitz & Latman, P.C.

(57) ABSTRACT

An image pickup apparatus having an image pickup element with a plurality of image pickup pixels and a plurality of focus detection pixels, a focus detector performing a focus detection based on the output from the focus detection pixels corresponding to a focus detection area, and a setter configured to set a usable F-number based on stored information of a defective pixel that exists in the focus detection pixels. When the defective pixel exists in the focus detection pixels corresponding to the focus detection area, if an F-number is within the usable F-number, the focus detector performs focus detection by using the output from the defective pixel, and if the F-number is out of the usable F-number, the focus detector performs focus detection without using such output.

14 Claims, 13 Drawing Sheets

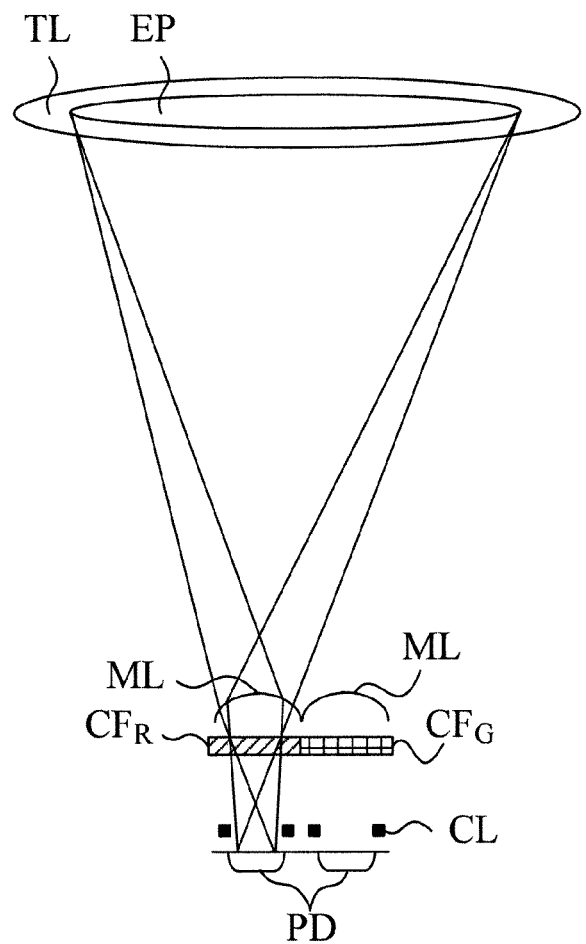
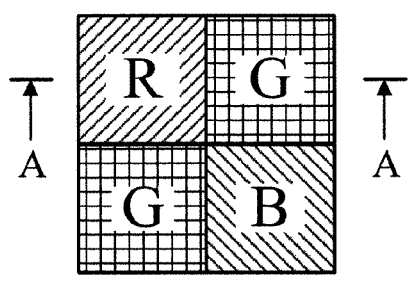
PLANE DIAGRAM
A-A CROSS-SECTION DIAGRAM
FIG. 3A
FIG. 3B

PLANE DIAGRAM

A-A CROSS-SECTION DIAGRAM

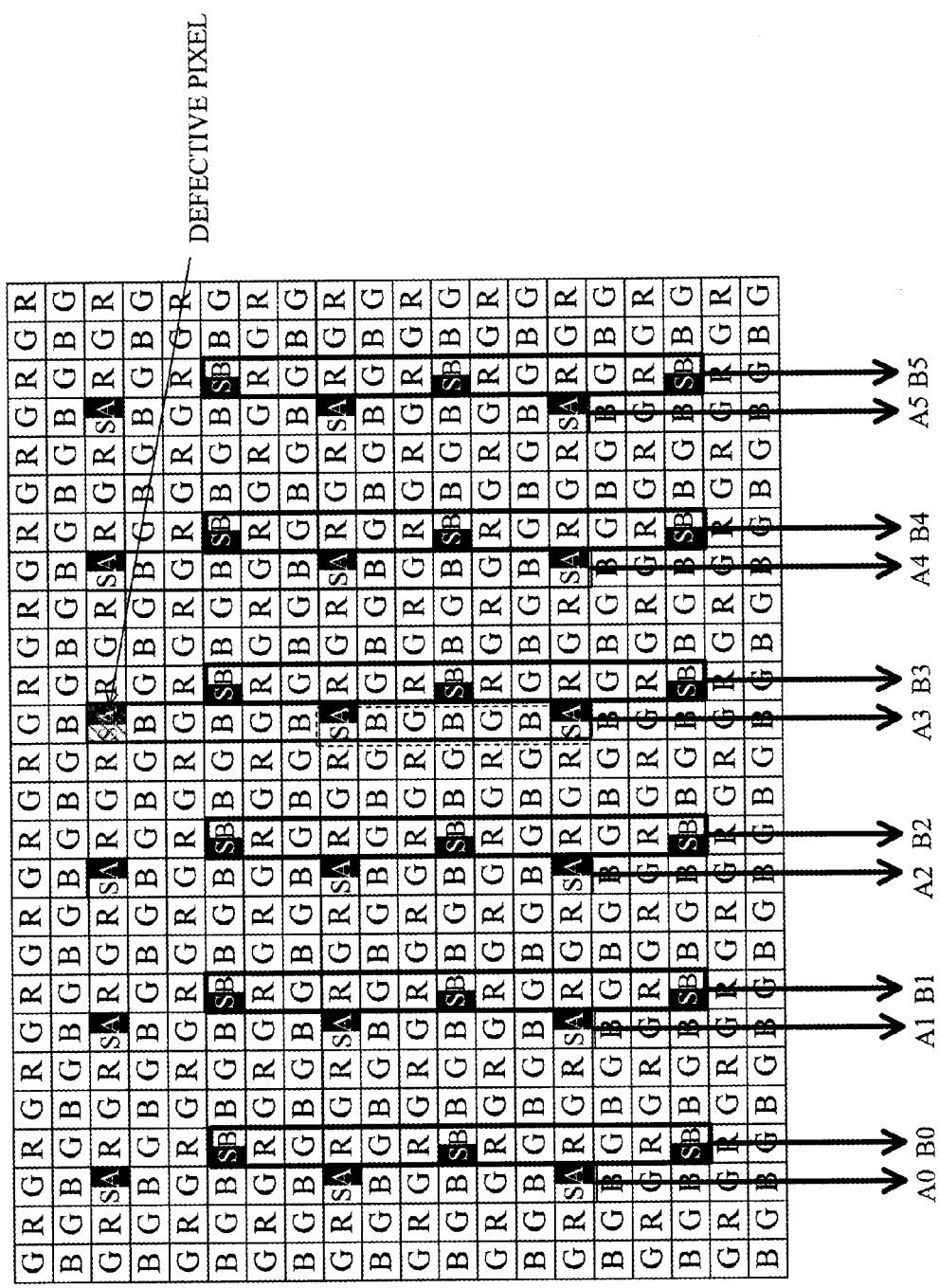

IMAGE PICKUP APPARATUS HAVING FOCUS DETECTING FUNCTION

BACKGROUND OF THE INVENTION

1. Field of the Invention

The present invention relates to an image pickup apparatus having the focus detecting function in a digital camera, a video camera, or the like.

2. Description of the Related Art

As an example of an image pickup element that includes a function element having a specific function in a part of a pixel group that forms the image pickup element, there is a technology to eliminate the use of a dedicated AF sensor by providing a phase difference detecting function of an object image for an image pickup element and to achieve a high-speed phase difference AF.

For example, Japanese Patent Laid-Open No. 2000-292686 provides a pupil divide function by decentering a sensitivity area of a light-receiving part for an optical axis of an on-chip microlens in light-receiving elements (pixel) of part of the image pickup element. These pixels are aligned as focus detection pixels at a predetermined interval in an image pickup pixel group, and thereby a focus detection using a phase difference method is performed Moreover, there is a technology about a case where there are defective pixels in these focus detection pixel groups.

Japanese Patent Laid-Open No. 2009-163229 discloses a technology to correct a pixel signal of a focus detection pixel with a defect by a pixel signal of a focus detection pixel without defects. Japanese Patent Laid-Open No. 2001-177756 discloses a method of setting a focusing area at a position where there is no defective pixel and which is in a predetermined direction from an area including a defective pixel, when there is the defective pixel in the focusing area.

However, in an image pickup apparatus of the above-mentioned Japanese Patent Laid-Open 2009-163229, a sample pitch becomes rough when, for example, the focus detection pixel is discretely aligned on an image pickup surface, and therefore it is difficult to accurately correct an output of the defective pixel, especially in an object having a high spatial frequency. Further, an image pickup apparatus of Japanese Patent Laid-Open No. 2001-177756 has a problem where a user's desired focusing region may be changed.

SUMMARY OF THE INVENTION

The present invention provides an image pickup apparatus capable of effectively using a defective pixel within an allowable range of the accuracy of focus detection, even if there is the defective pixel in the focus detection pixel group.

An image pickup apparatus as one aspect of the present invention includes an image pickup element including a plurality of image pickup pixels that perform photoelectric conversion of light obtained from an image pickup lens to generate an image of an object and a plurality of focus detection pixels that receive light passing through a part of an area of an exit pupil of the image pickup lens, a focus detector configured to perform a focus detection based on a signal output from the focus detection pixels corresponding to a focus detection area, a memory configured to store information of a defective pixel that exists in the focus detection pixels, and a setter configured to set a usable F-number based on the information of the defective pixel that is stored in the memory. When the defective pixel exists in the focus detection pixels corresponding to the focus detection area, if an F-number is within the usable F-number, the focus detector performs the focus detection by using the signal output from the defective pixel, and if the F-number is out of the usable F-number, the focus detector performs the focus detection without using the signal output from the defective pixel.

Further features and aspects of the present invention will become apparent from the following description of exemplary embodiments with reference to the attached drawings.

BRIEF DESCRIPTION OF THE DRAWINGS

FIGS. 3A-3B are a plan diagram and a cross-section diagram of an image pickup pixel in the embodiment of the present invention.

FIGS. 6A-6C are layout diagrams of the focus detection pixels of the image pickup element in the embodiment of the present invention.

DESCRIPTION OF THE PREFERRED EMBODIMENTS

Hereinafter, an exemplary embodiment of the present invention will be described below with reference to the accompanied drawings.

First Embodiment

Figure 1A:
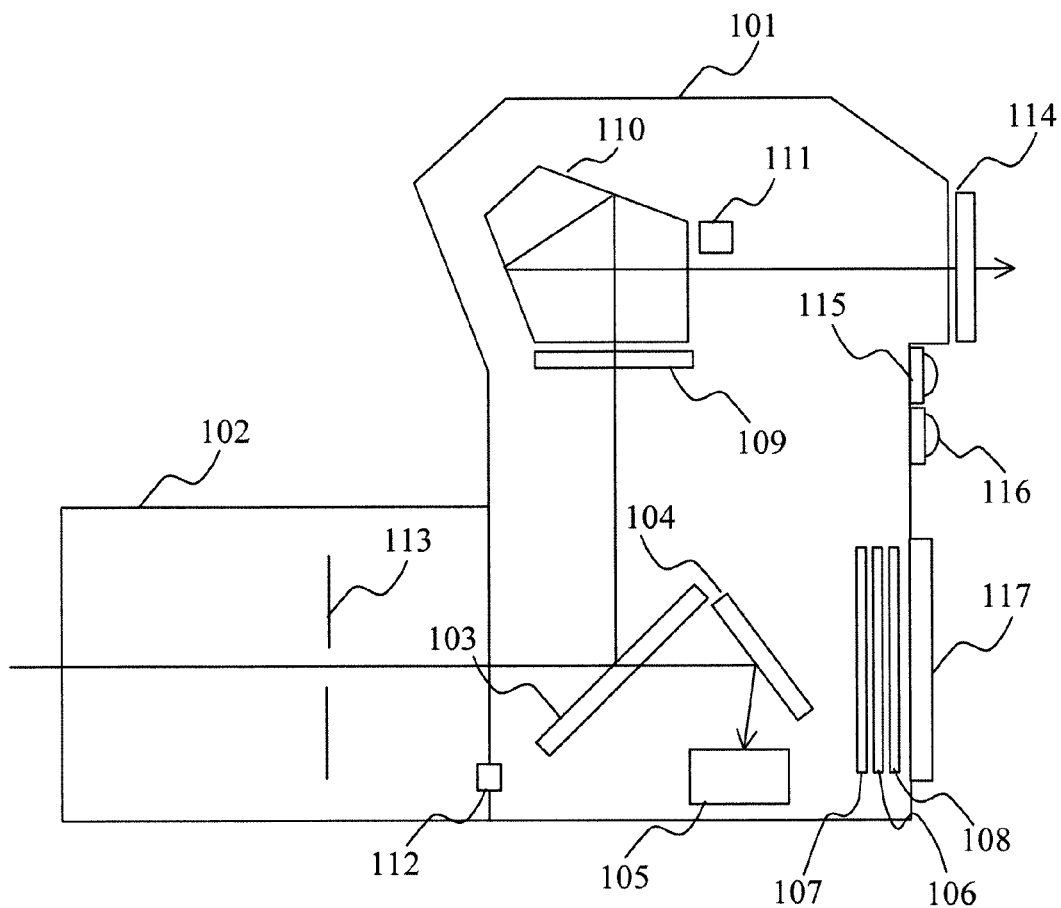
FIGS. 1A-1B are cross-section diagrams of a digital SLR camera (digital single lens reflex camera) in an embodiment of the present invention.
Figure 1B:
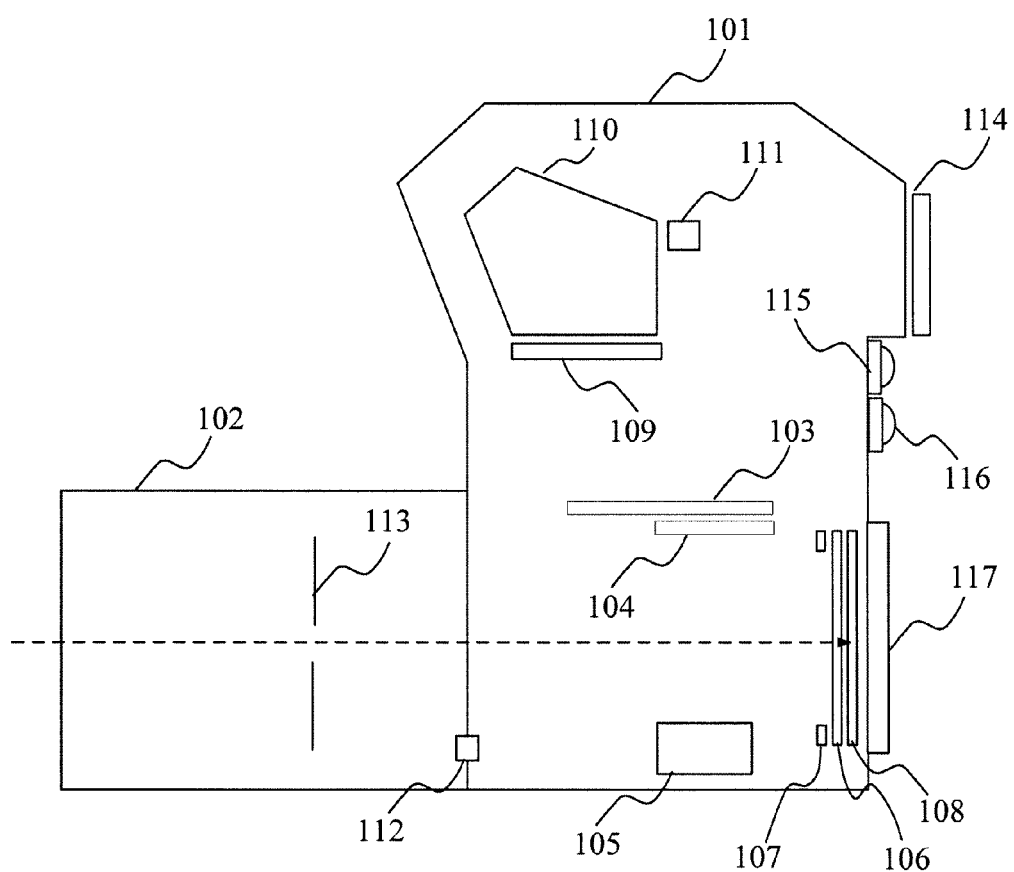

FIGS. 1A-1B are cross-section diagrams of an image pickup apparatus in an embodiment of the present invention. In this embodiment, a digital SLR camera (digital single lens reflex camera) is explained as an example. A reference numeral 101 in FIG. 1A denotes a camera body, and an image pickup lens 102 is mounted on the front surface of the camera body. The image pickup lens 102 is interchangeable, and further the camera body 101 and the image pickup lens 102 are electrically connected with each other via a mount contact group 112. Furthermore, there is an aperture 113 in the image pickup lens 102, and the amount of light guided into the camera can be adjusted.

A reference numeral 103 denotes a main mirror, and it uses a half mirror. The main mirror 103 is obliquely provided on an image pickup optical path in a finder observational state in FIG. 1A, and reflects an image pickup light flux from the image pickup lens 102 to a finder optical system and guides transmitted light to an AF unit 105 via a sub-mirror 104.

The AF unit 105 is an AF sensor using a phase difference detection method. Since a focus detection using the phase difference detection method is a well-known technology, a concrete control is omitted here. The AF unit 105 forms a secondary imaging plane of the image pickup lens 102 on the focus detection line sensor, thereby detecting a focusing state of the image pickup lens 102. A focusing lens (not illustrated) is driven based on the detection result, and an automatic focus detection is performed.

A reference numeral 108 denotes an image pickup element, a reference numeral 106 denotes a low-pass filter, and a reference numeral 107 denotes a focal-plane shutter. Moreover, there is a temperature detector (not shown) near the image pickup element 108.

A reference numeral 109 denotes a focusing screen disposed on an expected imaging surface of the image pickup lens 102 included in a finder optical system, and a reference numeral 110 denotes a pentaprism for changing a finder optical path. A reference numeral 114 denotes an eyepiece, and the photographer can confirm an image taking screen by observing the focusing screen 109 therefrom. Moreover, a reference numeral 111 denotes an AE unit, and is used when a light measurement is performed.

A reference numeral 115 denotes a release button, and is a two step pushing type switch which has a half press state and a full press state. The half press of the release button 115 provides a preliminary operation before an image is taken, such as an AE operation and an AF operation, and the full press provides an exposure of the image pickup element 108 for an image pickup processing. Hereinafter, the state of the half press of the release button 115 is referred to as a state that SW1 is ON, and the state of the full-pressed is referred to as the state that SW2 is ON.

The camera in this embodiment changes a form of an optical finder state illustrated in FIG. 1A to a form illustrated in FIG. 1B when an exposure/live view is performed. A reference numeral 116 denotes a live view start/end button, and an optical finder mode illustrated in FIG. 1A and a live view mode illustrated in FIG. 1B are switched every the press of the button.

FIG. 1B illustrates the cross-section diagram of the camera in the live view mode, the exposure of a still image and the record of a moving image. In these modes, the main mirror 103 and the sub-mirror 104 are retracted outside the image pickup optical path and the focal plane shutter 107 is opened, and thereby the image pickup light flux is straightly introduced into the image pickup element 108. A reference numeral 117 denotes a display unit (display apparatus), and is provided on a back surface of the camera body 101. The display unit 117 is formed by a liquid crystal panel or the likes, and performs a live view display by displaying a signal (image data) from the image pickup element 108 in real time. Further, previous image pickup data stored in a memory (not illustrated) is read out, thereby performing a reproduce or a display of a stored still image or a moving image file.

The following describes the AF operation in the live view state or in the record of the moving image. In the camera in this embodiment, the AF operation in the optical finder state is performed by using information from the AF unit 105, but the AF operation in the live view state is performed by a phase difference method using output information of the focus detection pixel group included in the image pickup element. Hereinafter, the image pickup pixel and the focus detection pixel will be described in reference to figures.

Figure 2:
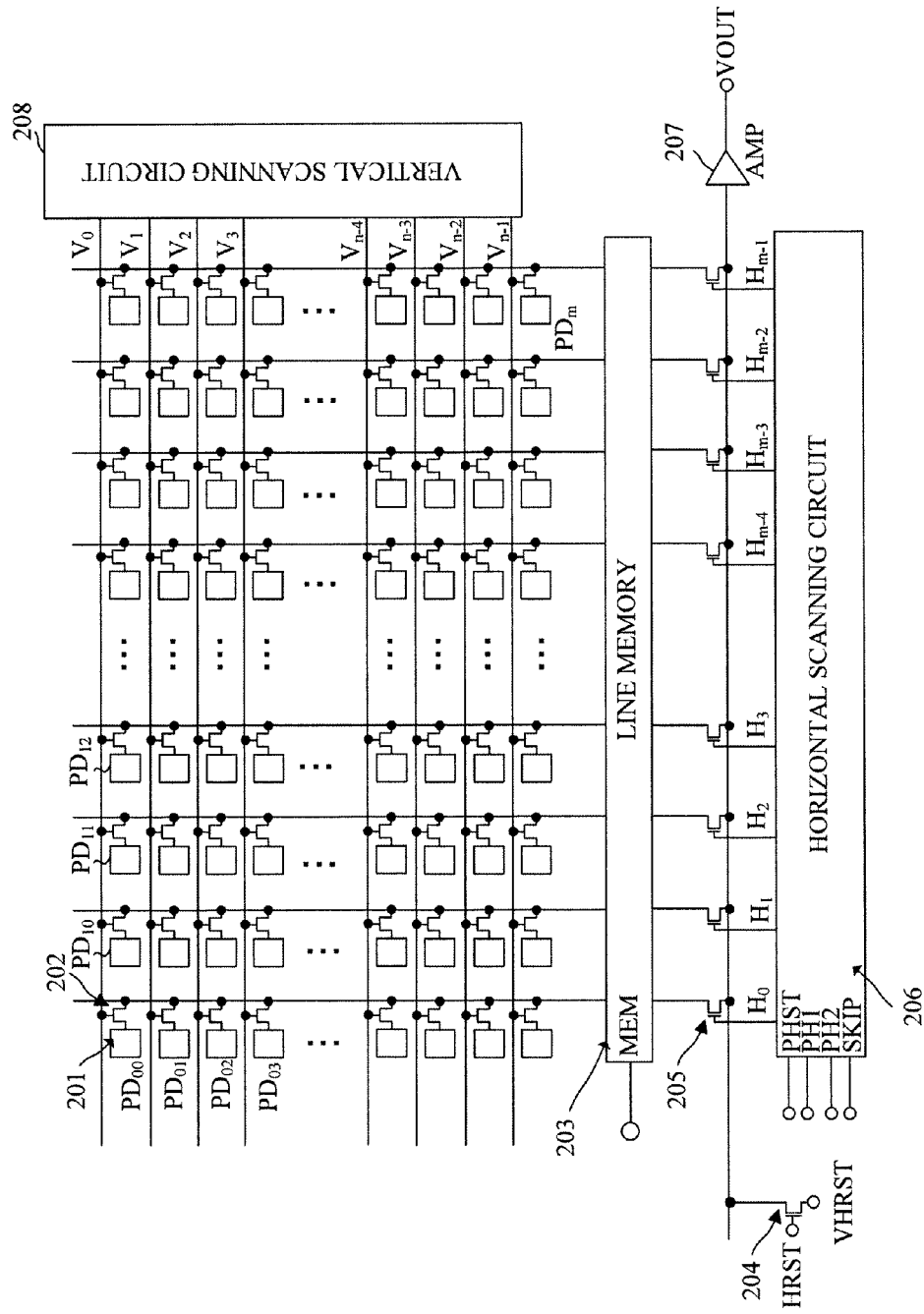
FIG. 2 is a block diagram of an image pickup element in the embodiment of the present invention.

FIG. 2 illustrates a block diagram of the image pickup element. The block diagram in FIG. 2 illustrates a minimum composition capable of explaining a readout operation, and omits a pixel reset signal and the likes. In FIG. 2, a reference numeral 201 denotes a photoelectrical conversion part (hereinafter referred to as "PDmn". "m" denotes an X direction address and m=0, 1, . . . , m−1. "n" denotes a Y direction address and n=0, 1, . . . , n−1.) The photoelectrical conversion part 201 is configured by a photodiode, a pixel amplifier, a reset switch and the likes. As for the image pickup element of the present invention, m×n photoelectrical conversion part is arranged in two dimensions. Its sign is described only in the vicinity of a photoelectrical conversion part $PD_{00}$ in the top-left because of the avoidance of vexatious complication.

A reference numeral 202 denotes a switch for selecting the output of PDmn of the photoelectrical conversion part, and it is selected every a line with a vertical operation circuit 208.

A reference numeral 203 denotes a line memory for temporarily storing the photoelectrical conversion part PDmn output of the reference numeral 201, and stores the output of the photoelectrical conversion part for one line, which is selected by the vertical scanning circuit. Usually, a capacitor is used.

A reference numeral 204 denotes a switch which is connected with a horizontal output line and is for resetting the horizontal output line to a predetermined electrical potential VHRST, and it is controlled with a signal HRST.

A reference numeral 205 denotes a switch to sequentially output the photoelectrical conversion part PDmn stored in the line memory of the above-mentioned 203 to the horizontal output line. The output of the photoelectric conversion for one line is read out by sequentially scanning switches from H0 to Hm−1 in the switch 205 by using a horizontal scanning circuit of a reference numeral 206 described later.

The reference numeral 206 denotes a horizontal scanning circuit, and sequentially controls the output of the photoelectrical conversion part stored in the line memory to output to the horizontal output line. A signal PHST denotes data input of the horizontal scanning circuit, and PH1 and PH2 denote shift clock input. It is configured so that the data is set in PH1=H and the data is latched in PH2=H. It is possible that, by inputting a shift clock to PH1 and PH2, the PHST is sequentially shifted and the switches from H0 to Hm−1 is sequentially turned on, and it is output to a VOUT through an amplifier 207. A SKIP denotes a control terminal input to perform a setting in a pixel skipping readout. When the SKIP terminal is set to an H level, it becomes possible that the horizontal scanning circuit is skipped at a predetermined interval.

A reference numeral 208 denotes the vertical scanning circuit, and the selection switch 202 of the photoelectrical conversion part PDmn can be selected by sequentially performing the scan and outputting from $V_o$ to $V_{n-1}$. The control signal is controlled by data input PVST, shift clocks PV1 and PV2, and pixel skipping read setting SKIP, as with the horizontal scanning circuit. A detailed explanation is omitted because it is similar to the horizontal scanning circuit for operation. Moreover, in the figure, the above-mentioned control signal is not illustrated.

FIGS. 3A-3B and FIGS. 4A-4B are diagrams for explaining structures of the image pickup pixel and the focus detection pixel. This embodiment uses Bayer array, where a pixel having the spectrum sensitivity of G (green) is arranged in diagonal two pixels among four pixels of 2×2 and pixels respectively having an R (red) and a B (blue) spectrum sensitivities are arranged in the other two pixels. In Bayer array, the focus detection pixels having the after-mentioned configuration is dispersed and arranged by a predetermined rule.

FIGS. 3A-3B illustrate the arrangement and the structure of the image pickup pixel. FIG. 3A is a plane diagram of the image pickup pixel of 2×2. In Bayer array, the G pixels are arranged in the diagonal direction and the pixels of R and B are arranged in the other two pixels, and the structure of two rows×two columns is arranged repeatedly. This image pickup pixel group photoelectrically converts light from the image pickup lens, thereby generating an image of an object.

FIG. 3B illustrates a section A-A of FIG. 3A. ML denotes an on-chip microlens arranged on the foreground of each pixel, $CF_R$ denotes a color filter of R(Red), and $CF_G$ denotes a color filter of G (Green). PD denotes a schematically illustrated photoelectrical conversion part of a C-MOS sensor, and CL denotes a wiring layer to form a signal line which transmits various signals in the C-MOS sensor. TL denotes a schematically illustrated image pickup optical system.

The on-chip microlens ML and the photoelectrical conversion part PD in the image pickup element are configured so as to effectively introduce, as much as possible, a light flux that has transmitted the image pickup optical system TL. In other words, an exit pupil EP and the photoelectrical conversion part PD of the optics system TL have a conjugate relationship with each other by the microlens ML, and the effective area of the photoelectrical conversion part is designed as a large area. Moreover, as the incident light flux of the G pixel has been explained in reference to FIG. 3B, the R pixel and the B (Blue) pixel have the same configuration as it. Accordingly, the exit pupil EP corresponding to each pixel of RGB for taking an image has a large diameter, and S/N of the image signal are improved by effectively introducing the light flux from the object.

Figure 4A:
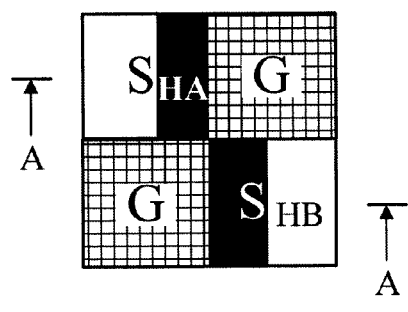
FIGS. 4A-4B are a plan diagram and a cross-section diagram of a focus detection pixel in the embodiment of the present invention.
Figure 4B:
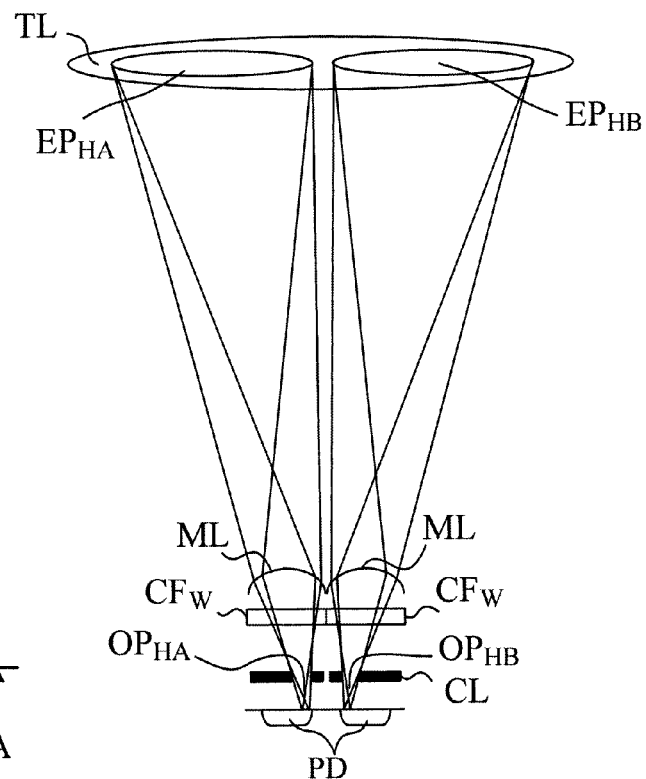

FIGS. 4A-4B illustrate a structure and an arrangement of a focus detection pixel to divide the pupil in the horizontal direction (lateral direction) of the image pickup optical system. The horizontal direction or the lateral direction is defined as a direction that is orthogonal to the optical axis and is parallel to a line extending in the horizontal direction when the camera is held so as to level the optical axis of the image pickup optical system. FIG. 4A is a plane diagram of pixels of two rows×two columns including the focus detection pixel. When an image signal is obtained for the recording or the observation, a main component of the brightness information is acquired with the G pixels. Since human image recognition characteristic is sensitive to brightness information, the image deterioration is easily recognized when the G pixel lacks. On the other hand, the R or B pixel is a pixel to obtain color information (color-difference information) but the human visual feature is insensitive to color information, and therefore the image deterioration is hardly recognized even when some pixels to obtain color information lack. Therefore, in the pixels of two rows×two columns in this embodiment, the G pixels are remained as the image pickup pixel and the R and B pixel are replaced the focus detection pixels. This is illustrated as $S_{HA}$ and $S_{HB}$ in FIG. 4A.

FIG. 4B illustrates the section A-A in FIG. 4A. The microlens ML and the photoelectrical conversion part PD have the same structure as the image pickup pixel illustrated in FIG. 3B. In this embodiment, since the focus detection signal of the focus detection pixel is used in the image generation, a transparent film $CF_W$ (White) is arranged instead of a color filter for color separator. Moreover, since the pupil divide is performed with the image pickup element, the opening of the wiring layer CL is biased in one direction to a center line of the microlens ML. In particular, the opening $OP_{HA}$ of the pixel $S_{HA}$ is biased toward the right side, and therefore a light flux passing through the exit pupil $EP_{HA}$ in the left side of the image pickup optical system TL is received. Similarly, the opening $OP_{HB}$ of the pixel $S_{HB}$ is biased toward the left side, a light flux passing through the exit pupil $EP_{HB}$ in the right side of the image pickup optical system TL is received. Therefore, the focus detection pixel receives light passing through a part area of the exit pupil of the image pickup lens 102. The pixel $S_{HA}$ is regularly arranged in the horizontal direction and the object image obtained with the focus detection pixel group is defined as an A image, and the pixel $S_{HB}$ is also regularly arranged in the horizontal direction and the object image obtained with the focus detection pixel group is defined as a B image. A focus detector (not illustrated) can detect a relative position of the A image and the B image and calculate a focus shift amount (defocus amount) of the object image by multiplying a shift amount of the image by a conversion coefficient.

The above-mentioned pixels $S_{HA}$ and $S_{HB}$ are capable of detecting a focus of an object having a brightness distribution in the lateral direction of the image pickup screen (for example, longitudinal line), but incapable of detecting a focus of an object having a brightness distribution in the longitudinal direction (for example, lateral line). In this respect, if pixels having the same configuration where the openings of $S_{HA}$ and $S_{HB}$ are biased in not the horizontal direction but the vertical direction (longitudinal direction) are arranged as the focus detection pixel group, an automatic focus detection operation can be also performed with respect to the object in the lateral line.

Figures 5A, 5B:
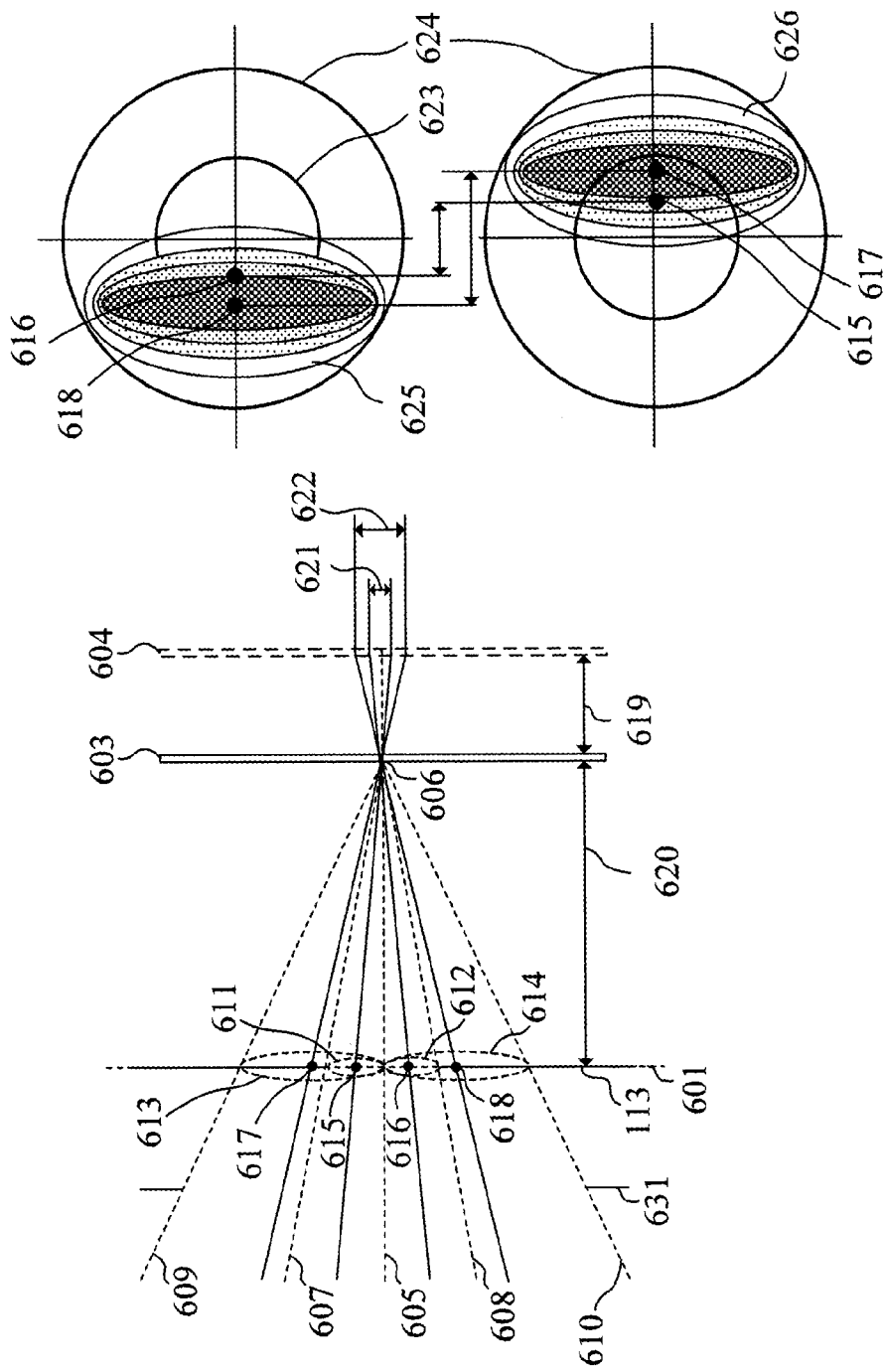
FIGS. 5A-5B are diagrams for explaining a vignetting of the focus detection pixel and an interval between centroids of focus detection light fluxes in the embodiment of the present invention.

The following explains how to calculate the conversion coefficient for calculating the defocus amount from the image shift amount. The conversion coefficient can be calculated based on aperture diameter information of the imaging optical system and a sensitive distribution of the focus detection pixel. A light flux limited by some configuration members, such as the aperture 113 and a lens holding frame 631 of the image pickup lens, enters the image pickup element 108 (hereinafter referred to as "image sensor"). FIGS. 5A-5B illustrate that a light flux used for the focus detection is limited by a vignetting of the image pickup optical system. FIG. 5A illustrates the light flux is limited with the aperture 113 of the imaging optical system disposed on an exit pupil surface 601 in a pixel adjacent to a center of the image sensor. In FIG. 5A, reference numerals 603 and 604 denote image sensors (603 is at preliminary imaging surface position), a reference numeral 605 denotes an optical axis, and a reference numeral 606 denotes an optical axis position on the image sensor. Reference numerals 607 and 608 denote light fluxes limited with the aperture, and reference numerals 609 and 610 denote not limited light fluxes. Focus detection light fluxes corresponding to the light fluxes 607 and 608 are described as 611 and 612, and the barycentric position of the focus detection fluxes are described as 615 and 616. Similarly, focus detection light fluxes corresponding to the light fluxes 609 and 610 are described as 613 and 614, and the barycentric position of the focus detection fluxes are described as 617 and 618.

FIG. 5B is a diagram that illustrates a change of the barycentric position due to a vignetting in the exit pupil surface 601 of the focus detection pixel in the center of the image sensor. In FIG. 5B, reference numerals 623 and 624 denote pupil area of the limited light fluxes 607 and 608 and the not limited light fluxes 609 and 610 for the pixel in the center of the image sensor. Reference numerals 625 and 626 denote the incident angle characteristic of the focus detection pixel $S_{HA}$ and $S_{HB}$. A light flux transmitted to have the inside of shapes illustrated in 623 and 624 enters the focus detection pixel $S_{HA}$ and $S_{HB}$ as the sensitive distribution illustrated in 625 and 626. Therefore, by obtaining each barycenter of the distributions of the focus detection flux transmitted to have the inside of the shapes illustrated in 623 and 624, a barycenter interval can be obtained each with respect to the case that a light flux used for the focus detection is limited and the case that it is not limited. The conversion coefficient for calculating the defocus amount from the image shift amount is obtained by calculating focus sensitive distribution information of the focus detection pixel and aperture diameter information of the imaging optical system based on the measurement and the calculation and by storing them.

In FIG. 5A, a defocus amount 619 is defined as DEF. Difference 620 from the image sensor 603 to the exit pupil surface 601 is defined as L. The barycenter intervals of the case that the light flux used for focus detection is limited and the case that it is not limited are respectively defined as G1 (the difference between 615 and 616) and G2 (the difference between 617 and 618). Further, the image shift amounts are defined as PRED 1 (621) and PRED2 (622). When the conversion coefficients that convert the image shift amount into the defocus amount are defined as K1 and K2, the defocus amount is calculated by the following equation:

$$DEF = K1 \times PRED1 = K2 \times PRED2 \quad \text{EQUATION 1}$$

The conversion coefficients K1 and K2 that convert the image shift amount into the defocus amount are calculated by the following equation:

$$K1 = L/G1 \text{ (the case that the light flux is limited)}$$

$$K2 = L/G2 \text{ (the case that the light flux is not limited)} \quad \text{EQUATION 2}$$

In the above equations, K1>K2 is specified because of G1<G2. This generally means that the value of the conversion coefficient K becomes large as the light flux used for focus detection is limited. In other words, the values of the conversion coefficients K1 and K2 become large as the F-number of the image pickup lens in the focus detection is made large, and the sensitivity of the defocus amount to the image shift amount PDED increases.

Figure 6B:
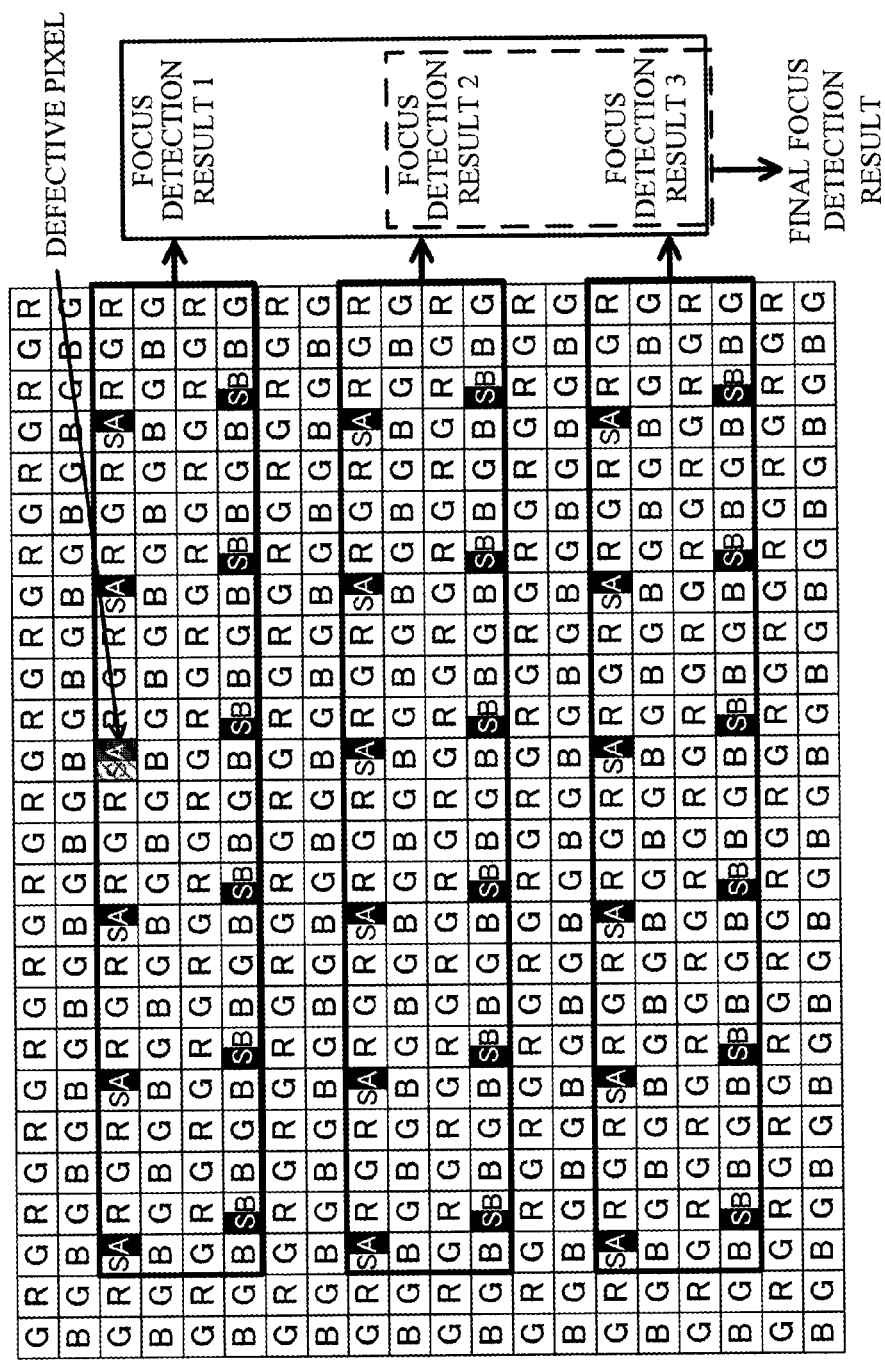
Figure 6C:
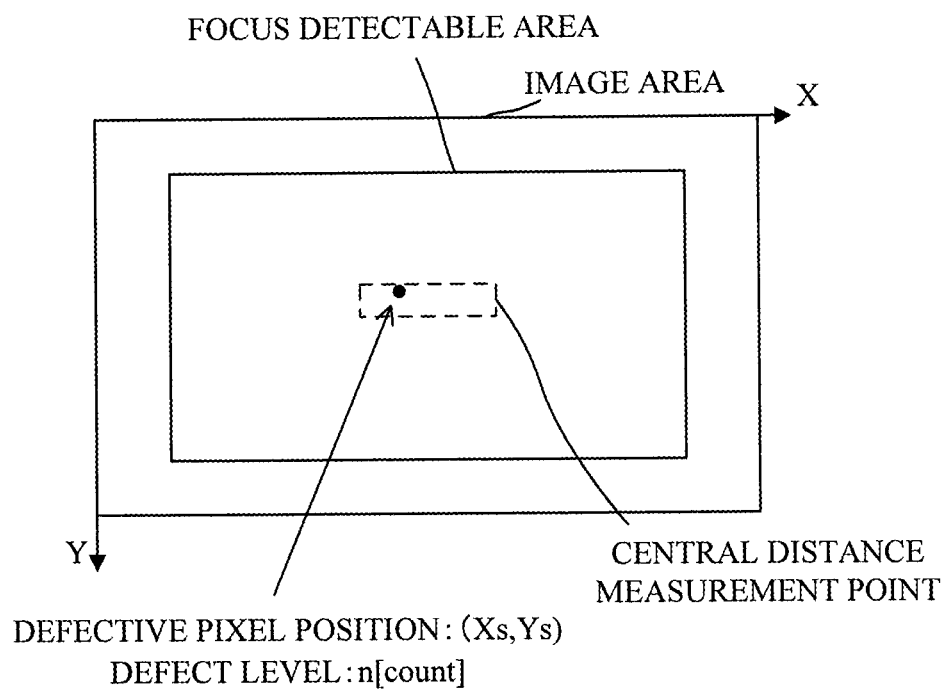

FIG. 6A is a diagram that illustrates the arrangements of the image pickup pixel and the focus detection pixel. In FIGS. 6A-6C, "G" denotes a pixel where a green filter is coated, "R" denotes a pixel where a red filter is coated, and "B" denotes a pixel where a blue filter is coated. "$S_{HA}$" (it is described as "SA" in the figures to facilitate visualization) denotes a pixel for focus detection that is formed by biasing an opening of a pixel part in the horizontal direction, and these form a base pixel group to detect the image shift amount to the $S_{HB}$ pixel group in the horizontal direction. "$S_{HB}$" (it is described as "SB" in the figures to facilitate visualization) denotes a pixel for focus detection that is formed by biasing an opening of the pixel in a direction opposite to the $S_{HA}$ pixel, and these form a reference pixel group to detect the image shift amount to the $S_{HA}$ pixel group in the horizontal direction. The outline parts on a colored background in the $S_{HA}$ and $S_{HB}$ pixels represent an opening position of the biased pixels. In a focus detection operation, the $S_{HA}$ and $S_{HB}$ pixels are not used individually, signals of the A image and the B image are formed by summing the $S_{HA}$ and $S_{HB}$ pixels that exist in an area illustrated in thick-frame in FIG. 6A. "A0" and "B0" illustrated in the under part of FIG. 6A respectively denotes a top pixel of each of the A image and the B image, and the image signals are formed as A0, A1, A2, A3 ... with respect to the A image, and similarly are formed as B0, B1 ... with respect to the B image.

FIG. 6B is a deformation example of FIG. 6A, a pair of the A image and B image signals is formed from each of the $S_{HA}$ and $S_{HB}$ pixels that exist in the thick-frame in the figures, and the focus detection result is calculated from each pair. Further, this is a method of defining the average of a plurality of focus detection results as a final focus detection result.

FIG. 6 C is one example that illustrates a focus detectable area on the image pickup screen. In FIG. 6C, the focus detectable area has the arrangement of the pixels illustrated in FIG. 6A. In this embodiment, the focus detectable area covers an area about 70% of the image area on the left, right, top and bottom thereof. As an example, FIG. 6C illustrates in broken line a distance measurement line configured when the center of the screen is brought into focus.

With respect to all focus detection pixels laid out as illustrated in FIGS. 6A, 6B and 6C, there is a step for preliminarily checking whether or not each pixel is a defective pixel. If a pixel is determined as the defective pixel in the step, the position of the defective pixel and the size of the defect are stored in a memory (not illustrated) included inside the image pickup apparatus. The check step is performed in a factory or the likes, and uses, for example, a method of confirming the output of all focus detection pixels in a dark state where no light is introduced. Since the dark state has no light, 0 is expected as the output of the focus detection pixel; however, in the defective pixel, the output of the number of counts that constantly offsets by a predetermined amount from an expected value is obtained. Therefore, with respect to the focus detection pixel where the output in the dark state is depart from 0, as illustrated in FIG. 6C, a position (Xs, Ys) in the image pickup element and the number n of counts of the output of the dark state are stored in a memory included in the camera.

As above, in this embodiment, the plurality of the focus detection pixel groups where the opening is deviated for the center part of the screen in the horizontal direction are arranged in the area of 70% on the left, right, top and bottom of the image area, thereby performing the automatic focusing at an arbitrary point within the range of the focus detection pixel groups. Further, when there is a defect in the focus detection pixel, the position of the defective pixel and the size of the defect are listed and held as data.

Figure 7:
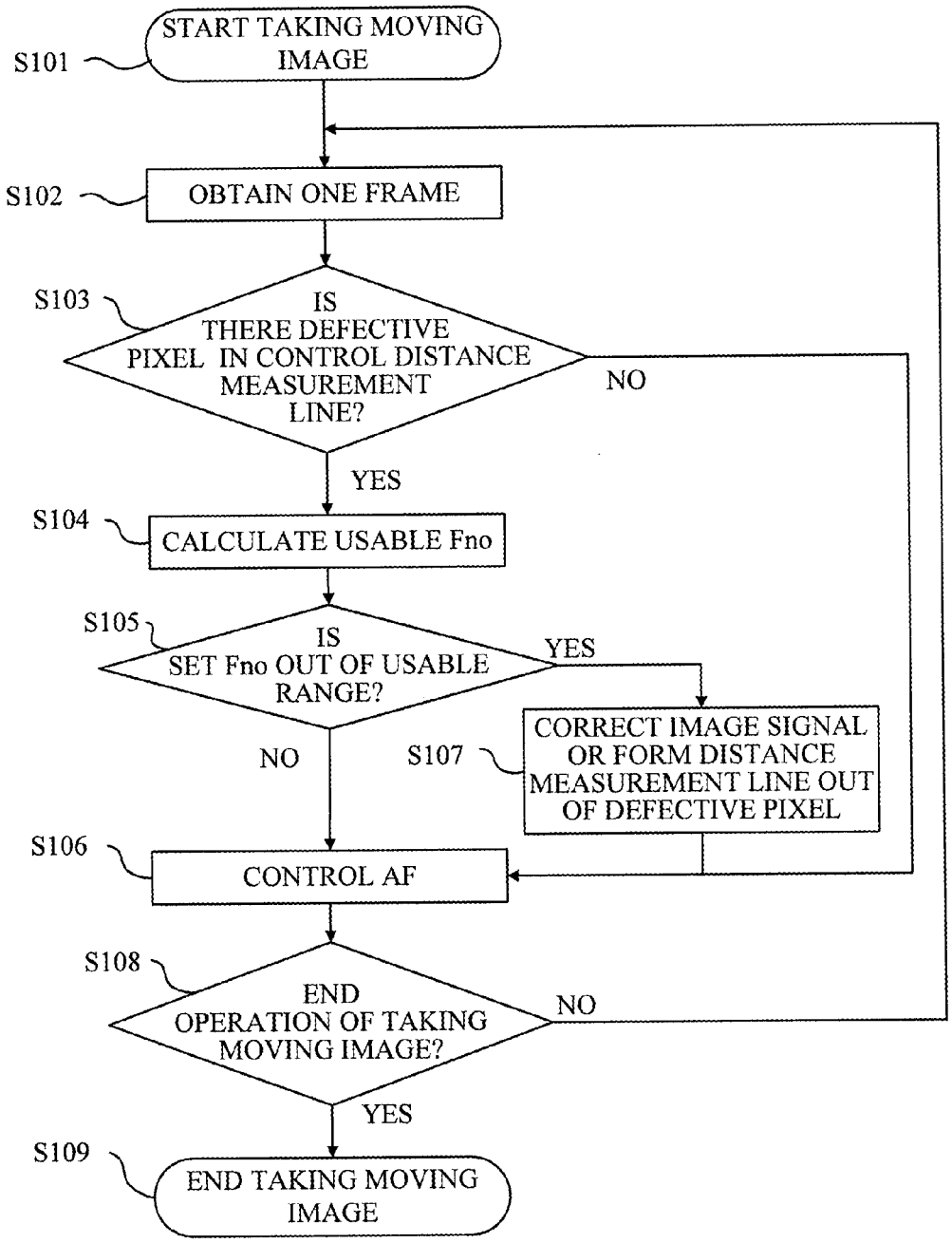
FIG. 7 is a flowchart when a moving image is taken by the image pickup apparatus in the embodiment of the present invention.

Next, a flowchart in this embodiment is illustrated in FIG. 7. A flow example when a moving image is taken will be explained with reference to FIG. 7. An operation in FIG. 7 is executed by a controller (setter), such as a micro computer (not illustrated).

When an instruction of starting taking the moving image is accepted from a user in step S101, the accumulation in the image pickup element 108 is performed in step S102 and the image information for one frame is acquired. In this case, the value of Fno of the image pickup lens in the accumulation of the image pickup element 108 is stored in the memory in the camera. After the image information is acquired, it proceeds to step S103.

Step S103 is a step where the focus detection pixel included in the image information acquired in step S102 is read out and it is checked whether there is no defective pixel in the readout focus detection pixel. In this case, a distance measurement line where the control is performed is determined depending on which point in the figure is brought into focus. The distance measurement line where the control is performed may be determined by "distance measurement automatic selection" or "distance measurement arbitrary selection" performed at a point that is preliminarily set by a user. The distance measurement point corresponds to the focus detection area. The "distance measurement automatic selection" calculates the defocus amount at the plurality of points in the screen, automatically determines, with a camera, a point thought to be best in a predetermined algorithm, and focuses on the point. The following, for the purposes of illustration, assumes that a distance measurement point in a screen center part is selected by a user in the "distance measurement point arbitrary selection". In this case, the calculation of the defocus amount is performed using the output of a focus detection pixel group in an area illustrated in broken line in FIG. 6C, it is checked for information of a defective pixel that is stored in the memory included in the camera whether there is no defective pixel in a focus detection pixel used in the calculation. If there is a defective pixel in the distance measurement line designed to perform the control, it proceeds to step S104, and if there is no defective pixel therein, it proceeds to step S106.

Step S104 calculates Fno usable depending on the level of the defect when there is the defective pixel in the distance measurement line designed to perform the control. The following describes the method in detail.

Figure 8A:
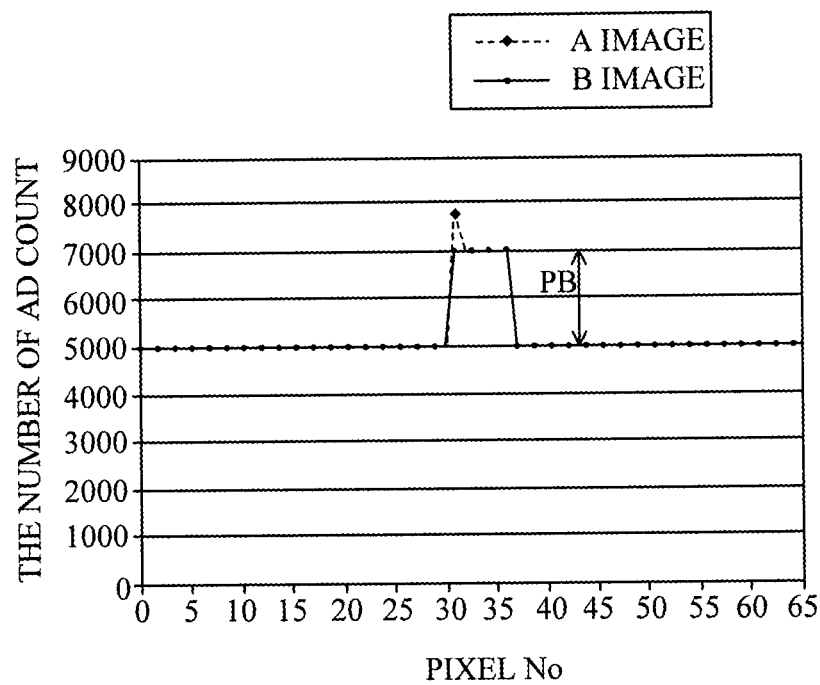
FIGS. 8A-8B are diagrams that illustrate an output of the focus detection pixel when there is a defect in the focus detection pixel, in the embodiment of the present invention.

It is assumed that a shape of waves like FIG. 8A is obtained as an image signal of a temporary distance measurement line designed to performs the control. This is an image signal where the A image and the B image basically agree with each other, but there is only one defective pixel in the A image. If there is no defective pixel, the image shift amount between the A and B images is zero because the A and B images agree with each other, and as a result, the defocus mount is also zero. However, in fact, because of the effect of the defective pixel, the image shift amount between the A and B images becomes non-zero depending on the position and the level of the defective pixel, and the changed amount means an error distance measurement amount in the defective pixel.

Figure 8B:
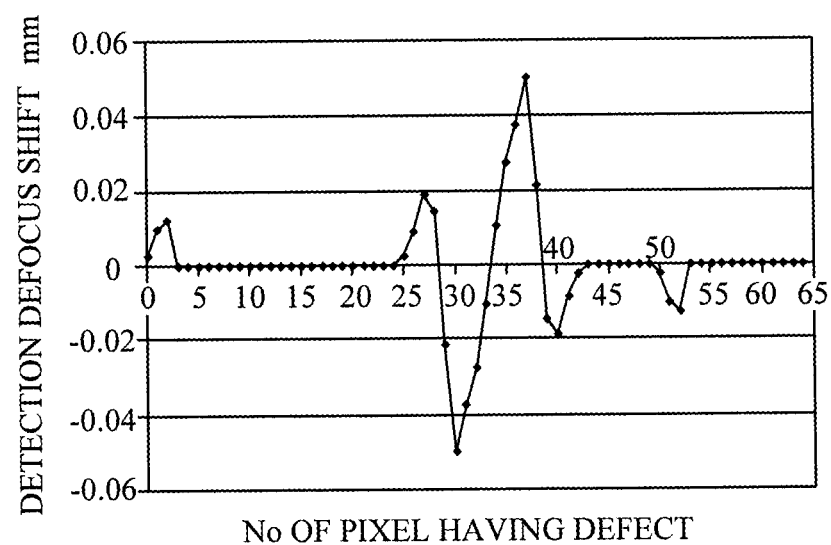

Hereinafter, in order to normalize, the size of a defect is expressed with "defect level" defined by a ratio to the contrast of the obtained image signal (the value divided by the difference between the maximum value and the minimum value of the image signal). This is because the correlation calculation to calculate the image shift amount usually depends largely on the contrast of the image signal of an input, and because it is more favorable in consideration of the effect of the defect that the size of the defect is also converted into a contrast ratio of the image signal. In terms of contrast of the image signal, since the case where there is the defective pixel in the A image is assumed in this example, the contrast is calculated by the B image without defects. As illustrated in FIGS. 8A-8B, when the B image is expressed as an image signal B(i) in all 65 pixels composed of B(0) to B(64), a contrast PB is calculated by the following equation:

$$PB = \mathrm{Max}\{B(i)\} - \mathrm{Min}\{B(i)\} \qquad \text{EQUATION 3}$$

The above indicates the case where there is the defective pixel in the A image, but if there is the defective pixel in the B image, the PB may be calculated by using an image signal A(i) of the A image.

When the number of counts in the dark state of the defective pixel preliminarily stored in the camera is defined as n[count], and the defect level S_lvl is calculated by the following equation:

$$S\_lvl = n/PB \qquad \text{EQUATION 4}$$

In an image pickup lens that is Fno=2, it is assumed that the only defective pixel in the A image has S_lvl=+40%. FIG. 8B represents an amount by which a finally obtained defocus amount shifts from a true defocus amount (=0) when it is assumed that this defective pixel exists in each of A(0) to A(64). As will be noted from FIG. 8B, even if the defect level is constant, a finally error distance measurement amount changes depending on a position in the image signal. Therefore, considering the effect of the defective pixel to the error distance measurement amount, the following describes the case of the most largely collapsing as the worst case. In other words, the distance measurement amount in the worst case of Fno=2 and S_lvl=+40 [%] is 50 [um] in an example illustrated in FIG. 8B.

An example of Fno=2 is illustrated above, but, as already explained, the value of the conversion coefficient K that converts the image shift amount into the defocus amount becomes large as Fno increases; therefore even when the image shift amount affected by the effect of the defective pixel is maintained, the error distance measurement amount is large when Fno is large.

Figure 9:
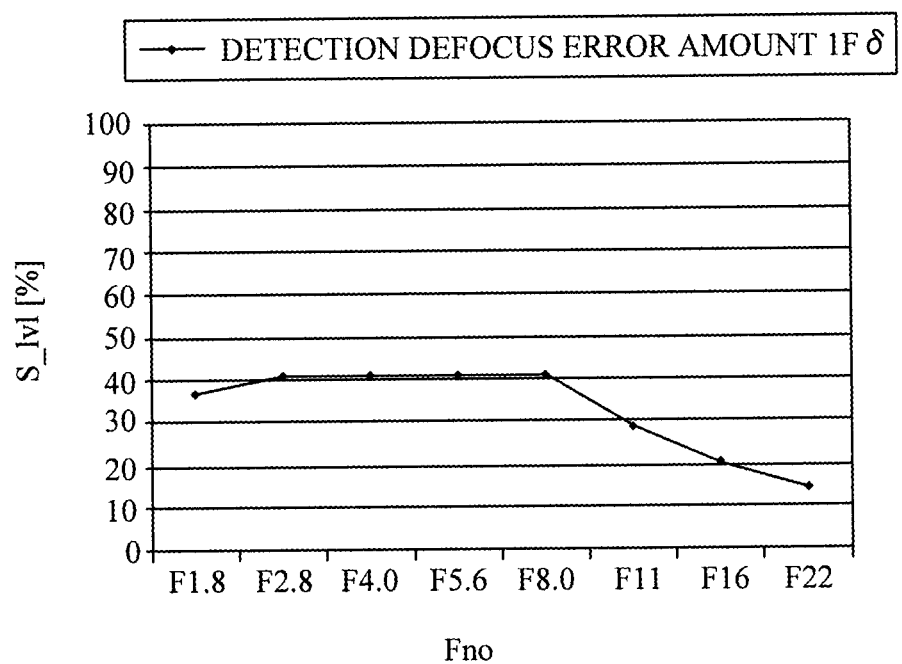
FIG. 9 is a diagram that illustrates a relationship of the amount of a detection defocus error based on a defect level and an Fno.

In light of the above, FIG. 9 defines Fno in the lateral axis and the defect level S_lvl in the longitudinal axis, and plots a line in which the distance measurement amount in the worst case is 1Fδ. The "δ" denotes a diameter of a permissible circle of confusion, the "F" denotes Fno of the lens, and the "Fδ" denotes a one-sided depth of focus. If the defect level and a requested distance measurement accuracy (the requested distance measurement accuracy is 1Fδ in an example of FIG. 9) are defined based on FIG. 9, a usable Fno can be determined. For example, when the defect level of the defective pixel in the control distance measurement line is 30 [%], the case of Fno<=8 is within the requested accuracy, but the case where the distance measurement is performed with Fno larger than it cannot satisfy the accuracy of 1Fδ. Therefore, step S104 defines the usable Fno from the defect level of the included defective pixel and the requested distance measurement accuracy by using the relationship in the graph of FIG. 9. However, the defect level of its defective pixel may change in accordance with the temperature change of the surrounding environment. For example, the defect level may rise as the temperature rises, or the defect level may lower as the temperature lowers. Accordingly, in step S104, it is preferred that the usable Fno in view also of temperature information using a temperature sensor (temperature detector) (not illustrated) and the likes that are provided on the camera body 101. The above explained the case where one pixel is defined as the defective pixel included in the distance measurement line where the control is performed, but in the case also where there is a plurality of defects, the usable Fno can be calculated by preparing a graph like FIG. 9. With regard to the defect level, in the case where there is a plurality of defective pixels, for example, a sum or an average value of S_lvl of all defective pixels may be used as a parameter. At any hand, since the error amount of the distance measurement generally becomes large as the number of defective pixel becomes large, the condition becomes hard. Simply, when there is a plurality of defective pixels, all Fno may be set as unusable (there is no usable Fno). If the usable Fno is determined in step S104, it proceeds to step S105.

Step S105 is a step for confirming whether Fno in the accumulation of the control distance measurement line is within the range of the usable Fno calculated in step S104. The Fno in the accumulation of the control distance measurement refers to numeral values stored in step S102. When it is within the range of the usable Fno, since the required distance measurement accuracy is satisfied, it proceeds to step S106 and the correlation calculation is performed for an image signal directly obtained by using the defective pixel. After the defocus amount is calculated and the drive of the focus lens is performed, the AF control in this frame is completed. On the other hand, when it is out of the range of the usable Fno, it proceeds to step S107.

As explained above, Fno in the distance measurement is not within the required distance measurement accuracy; therefore step S107 create the distance measurement line without using the defective pixel. If the distance measurement can be again performed by using Fno within the required measurement accuracy, the distance measurement should be performed by changing Fno; however the change of Fno becomes difficult because the exposure or the depth of field changes when Fno of the image pickup lens is changed in the record of the moving image. Further, there may be a defect whose the level is so large, and all Fno may be unusable (there is no usable Fno). In these cases, the distance measurement line is created without the correction processing of the image signal or the defective pixel and the acquired image signal is changed. As the method, for example there is a method described in the above-mentioned prior art documents, it is a processing of using a defective pixel output calculated based on the focus detection pixel surrounding the defective pixel, creating a distance measurement line not including the defective pixel in a near-field region of the defective pixel, or the likes. Moreover, for example, when a pixel illustrated with diagonal lines in FIG. 6A is a defective pixel, the image signal of the distance measurement line can be created out of the defective pixel by adding the output of two pixels illustrated with broken lines in the figure when a signal of A3 is calculated, increasing the calculated value by half, and setting it as the signal of A3. Further, in a method illustrated in FIG. 6B, when there is a defective pixel at a position illustrated in the feature, a final focus detection result may be set by averaging only the focus detection result of the plurality of pairs of the focus detection pixel groups surrounding with broken lines in the figure (except for pairs of the focus detection pixel group including the defective pixel). After the distance measurement line is created with avoiding the defective pixel like step S107, it proceeds to step S106 to perform the AF control.

After the AF control is performed in step S106, a state to wait for an end operation of taking the moving image from a user is started in step S108. At this time, in the case where the end operation of taking the moving image from the user is detected, it proceeds to step S109 and taking the moving image is ended, and in the case where the end operation of taking the moving image is not detected, it proceeds to step S102 and the next frame is acquired.

Figure 10:
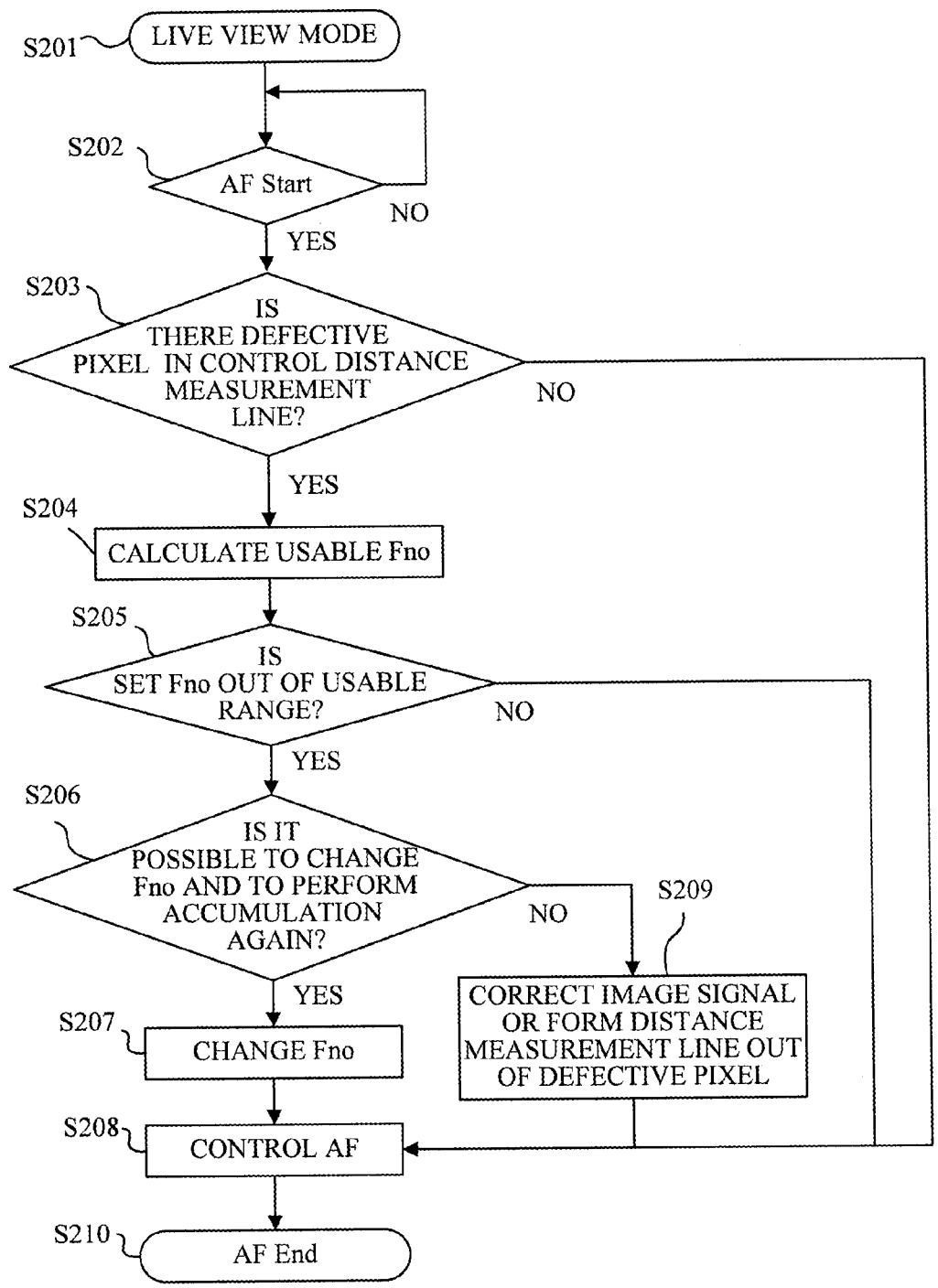
FIG. 10 is a flowchart in a live view of the image pickup apparatus in the embodiment of the present invention.

The flowchart illustrated in FIG. 7 explained a flowchart when the moving image is taken that is incapable of changing Fno in the operation, but FIG. 10 illustrates, as the deformation example, a flowchart in a live view display that has the potential of being able to change Fno in the operation.

In the live view mode (step S201), the acceptance of AF operation is waited in step S202. The AF operation is started after SW1 is turned on. Therefore, when SW1 is turned on, it proceeds to step S203 or later and the AF operation is performed, and then input is waited until SW2 is turned on.

The explanation of steps S203 to S205 is omitted since it is the same as that of steps S103 to S105.

It proceeds to step S206 when Fno of the image pickup lens in the distance measurement is out of the usable range in step S205. Since Fno in the distance measurement is out of the request measurement accuracy, if the accumulation of AF can be again performed, step S206 determines that Fno. If the distance measurement is performed in the live view mode, a user only has to be able to confirm the composition of the object with the display unit on the back surface. Therefore, if the little change of the exposure, the temporal response in the distance measurement, or the likes are caused, it is assumed that Fno may be changed to again perform the accumulation. However, in a manual exposure mode where a user determines the exposure condition or in a mode where a user preliminarily confirms the composition with the same depth of field as the case where the image is taken, Fno cannot be changed even in the live view mode. In cases like this or the case where the defect level is so large, all Fno are unusable (there is no usable Fno) and the likes, it proceeds to step S209, and in the case where Fno can be changed, it proceeds to step S207.

Step S207 changes Fno to any one of the usable Fno calculated in step S204, performs the accumulation of the control distance measurement line again, and performs the readout operation. The changed Fno can set any value within the usable Fno calculated in step S204, which, for example, may set a value where the difference from Fno before the change is least because the change of the visibility of the live view screen can be reduced. After Fno is changed in step S207, the accumulation of the control distance measurement line and the readout operation are performed, and then it proceeds to step S208.

The explanation of steps S208 and S209 is omitted since it is the same as that of steps S106 and S107. The AF control operation is completed in step S208, and the AF ends in step S210.

While the present invention has been described with reference to two of the moving image taking and the live view state, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-132876, filed on Jun. 15, 2011 which is hereby incorporated by reference herein in its entirety.

What is claimed is:

1. An image pickup apparatus comprising:
   an image pickup element including a plurality of focus detection pixels that receive light passing through a part of an area of an exit pupil of an image pickup lens and perform photoelectric conversation of the received light to generate a signal for a focus detection;
   a focus detector configured to perform the focus detection based on the signal output from the focus detection pixels corresponding to a focus detection area;
   a memory configured to store information of a defective pixel that exists in the focus detection pixels; and
   a setter configured to set a range of F-number to satisfy a predetermined condition based on the information of the defective pixel that is stored in the memory,
   wherein, when the defective pixel exists in the focus detection pixels corresponding to the focus detection area,
   if an F-number that is set during the photoelectric conversion to generate the signal for the focus detection is within the range of F-number set by setter, the focus detector performs the focus detection by using the signal output from the defective pixel, and
   if the F-number is out of the range of F-number set by the setter, the focus detector performs the focus detection without using the signal output from the defective pixel.

2. The image pickup apparatus according to claim 1, wherein the information of the defective pixel is information on a position of the defective pixel and a size of defect in that.

3. The image pickup apparatus according to claim 1, wherein, if the F-number is out of the range of F-number set by the setter, the focus detector performs the focus detection using a signal obtained by adding or averaging signals output from remaining focus detection pixels excluding the defective pixel of the focus detection pixels corresponding to the focus detection area.

4. The image pickup apparatus according to claim 1,
   wherein the focus detector has a plurality of pairs of the focus detection pixels, and are configured to generate a pair of image signals by each pair of the focus detection pixels and to perform the focus detection based on the generated pair of image signals, and wherein, if the F-number is out of the range of F-number set by the setter, the focus detector performs the focus detection based on an average of a focus detection result obtained using remaining pairs of focus detection pixels excluding a pair of the focus detection pixels that includes the defective pixel in the pairs of the focus detection pixels corresponding to the focus detection area.

5. The image pickup apparatus according to claim 1, further comprising a temperature detector disposed near the image pickup element,
wherein the setter is configured to set the range of F-number based on a detection result of the temperature detector and the information of the defective pixel that is stored in the memory.

6. The image pickup apparatus according to claim 2, wherein the setter is configured to calculate a defect level obtained by dividing a size of a defect in the defective pixel by a difference between the maximum value and the minimum value of the signal output from the focus detection pixels to set the range of F-number based on the defect level.

7. The image pickup apparatus according to claim 6, wherein, when the focus detection pixels include a plurality of defective pixels, the setter sets the range of F-number based on an average value of the defect levels of the plurality of the defective pixels.

8. An image pickup apparatus comprising:
an image pickup element including a plurality of focus detection pixels that receive light passing through a part of an area of an exit pupil of an image pickup lens and perform photoelectric conversion of the received light to generate a signal for a focus detection;
a focus detector configured to perform the focus detection based on the signal output from the focus detection pixels corresponding to a focus detection area;
a memory configured to store information of a defective pixel that exists in the focus detection pixels; and
a setter configured to set a range of F-number to satisfy a predetermined condition based on the information of the defective pixel that is stored in the memory,
wherein, when the defective pixel exists in the focus detection pixels corresponding to the focus detection area, if an F-number that is set during the photoelectric conversion to generate the signal for the focus detection is out of the range of F-number set by the setter, the F-number is changed so that the F-number is within the usable F-number.

9. The image pickup apparatus according to claim 8, further comprising a display configured to display image data from the image pickup element,
wherein the F-number of the image pickup lens in the focus detection is changed in a live view mode where the image data from the image pickup element is displayed on the display in real time.

10. A control method of an image pickup apparatus that includes an image pickup element and a memory, the image pickup element including a plurality of focus detection pixels that receive light passing through a part of an area of an exit pupil of an image pickup lens and perform photoelectric conversion of the received light to generate a signal for a focus detection, and the memory being configured to store information of a defective pixel that exists in the focus detection pixels, said control method comprising:
a focus detecting step of performing the focus detection based on the signal output from the focus detection pixels corresponding to a focus detection area;
a setting step of setting a range of F-number to satisfy a predetermined condition based on the information of the defective pixel that is stored in the memory,
wherein, in the focus detecting step, when the defective pixel exists in the focus detection pixels corresponding to the focus detection area,
if an F-number that is set during the photoelectric conversion to generate the signal for the focus detection is within the range of F-number set in the setting step, the focus detection is performed by using the signal output from the defective pixel, and
if the F-number is out of the range of F-number set the setting step, the focus detection is performed without using the signal output from the defective pixel.

11. The image pickup apparatus according to claim 1, wherein the predetermined condition is a requested distance measurement accuracy.

12. An image pickup apparatus comprising:
an image pickup element including a plurality of focus detection pixels that receive light passing through a part of an area of an exit pupil of an image pickup lens and perform photoelectric conversion of the received light to generate a signal for a focus detection;
a focus detector configured to perform the focus detection based on the signal output from the focus detection pixels corresponding to a focus detection area;
a memory configured to store information of a defective pixel that exists in the focus detection pixels; and
a setter configured to set a range of F-number to satisfy a predetermined condition based on the information of the defective pixel that is stored in the memory,
wherein, when the defective pixel exists in the focus detection pixels corresponding to the focus detection area, the focus detector determines whether to use the signal output from the defective pixel for the focus detection on the basis of an F-Number that is set during the photoelectric conversion to generate the signal for the focus detection, by determining whether the F-Number is within the range of F-number set by the setter.

13. The image pickup apparatus according to claim 12, wherein the predetermined condition is a requested distance measurement accuracy.

14. A control method of an image pickup apparatus that includes an image pickup element and a memory, the image pickup element including a plurality of focus detection pixels that receive light passing through a part of an area of an exit pupil of an image pickup lens and perform photoelectric conversion of the received light to generate a signal for a focus detection, and the memory being configured to store information of a defective pixel that exists in the focus detection pixels, said control method comprising:
a focus detecting step of performing the focus detection based on the signal output from the focus detection pixels corresponding to a focus detection area;
a setting step of setting a range of F-number to satisfy a predetermined condition based on the information of the defective pixel that is stored in the memory,
wherein, when the defective pixel exists in the focus detection pixels corresponding to the focus detection area, the focus detecting step determines whether to use the signal output from the defective pixel for the focus detection on the basis of an F-Number that is set during the photoelectric conversion to generate the signal for the focus detection, by determining whether the F-Number is within the range of F-number set in the setting step.

* * * * *